United States Patent Office — 3,781,346, Patented Dec. 25, 1973

3,781,346
PROCESS FOR PURIFICATION OF NAPHTHALENE CARBOXYLIC ACIDS

Richard V. Norton, Wilmington, Del., assignor to Sun Research and Development Co., Philadelphia, Pa.
No Drawing. Filed May 25, 1972, Ser. No. 257,026
Int. Cl. C07c 51/42
U.S. Cl. 260—525    5 Claims

ABSTRACT OF THE DISCLOSURE

A process for the purification of naphthalene carboxylic acids containing an aldehyde impurity which comprises heating a solid ammonium salt of said acid while sweeping said solid salt with steam.

---

Napthalene mono- and polycarboxylic acids are well known articles of commerce employed as intermediates to dyes, polymers, and specialty chemicals. In using these acids it is, of course, desirable to employ a pure material and numerous purification processes for aromatic acids are known in the art, particularly for phthalic acids. For example, in one technique, are detailed in Japanese Pat. 44/20,616 (Izukichi Kataoka et al.) a solution of terephthalic acid in ammonia water is first decolorized with carbon below 70° C., the solution is then heated to above 80° C. to separate monoammonium terephthalate, and finally the crystals of the salt are heated at 200° C. under reduced pressure to convert the salt to dry terephthalic acid crystals of high purity.

In another known technique for preparing terephthalic acid disclosed in U.S. 3,031,500 (Gasson et al., assigned to The Distillers Co., issued Apr. 24, 1962) diammonium terephthalate obtained by the hydrolysis of terephthalonitrile as described in U.S. 2,979,526 (Gasson et al., assigned to The Distillers Co., issued Apr. 11, 1961) is heated above 120° C. either as a dry solid or suspended in an inert liquid, the material being agitated during the reaction by mechanical means or by passing an inert gas through the system; e.g., hydrogen, nitrogen, carbon dioxide, or steam.

It is also known that the various processes for aromatic acids give products with different types of impurities. Preparation of such acids by liquid phase oxidation of alkyl substituted aromatic compounds yields acids with impurities resulting from the partial oxidation of the methyl groups and usually comprise aldehyde acids. Such impurities are, of course, different from those which are formed in the hydrolysis of aromatic nitriles to give the ammonium salts of the acid.

In accord with the invention a process is provided for purification of naphthalene carboxylic acids containing aldehyde impurities which comprises reacting a solid ammonium salt of said acid with steam at a temperature of from about 200° C. to about 300° C., preferably from about 290° C. to about 300° C. In the present invention the steam acts as a reactant to convert the aldehyde impurity to acid and although the manner by which the steam functions is not known precisely, it is believed that an aldimine is formed which reacts with an ammonium carboxylate group to form an imide that is, in turn, further reacted with water to form a carboxylic acid. The above sequence of reactions may be illustrated as follows (R and R' are the aromatic residues of the naphthalene carboxylic acid entity):

R—CHO + NH$_3$ → R—CH=NH + H$_2$O

R—CH=NH + R'—COO$^-$NH$_4^+$ →
       R—CO—NH—CO—R' + NH$_3$

R—CO—NH—CO—R' + H$_2$O (steam) →
       RCOOH + R'COOH + NH$_3$

The process is operable with the various isomeric naphthalene carboxylic acids, as for example: 1-naphthalene carboxylic acid, 2-naphthalene carboxylic acid, 1,4-naphthalene dicarboxylic acid, 2,4-naphthalene dicarboxylic acid, 2,6-naphthalene dicarboxylic acid, 1,5-naphthalene dicarboxylic acid, 1,8-naphthalene dicarboxylic acid, 1,4,5-naphthalene tricarboxylic acid, and the like.

In carrying out the process of the reaction, the naphthalene carboxylic acid is first converted to its ammonium salt and this is readily done by passing dry ammonia gas through a bed of the dry, solid acid. The formation of the salt is accompanied by the generation of heat (heat of neutralization) and this may be dissipated by cooling the external surfaces of the vessel in which reaction occurs. Alternatively, the acid may be converted to the salt by evaporating a solution of the acid with ammonium hydroxide or gaseous ammonia. In any of the techniques used, it is possible by controlling the molar amount of ammonia introduced, to form either the monoammonium salt, the diammonium salt or a mixture of both. After the salt is formed, the temperature of the solid salt is raised to the desired temperature and steam at the same temperature of the salt bed passed through the bed of crystals where the purification occurs. It will be understood that any of the physical systems available in the art may be used for this process; e.g., fluidized bed, fixed bed, rotating kiln, and the like, though a moving bed with counter-current steam flow is preferred.

In order to further illustrate the process of the invention the following examples given:

EXAMPLES 1 TO 17

Impure 2,6-naphthalene dicarboxylic acid prepared from the liquid-phase cobalt-catalyzed oxidation of 2,6-dimethylnaphthalene and containing 530 p.p.m. of ald-acid impurity was converted to its ammonium salt by passing dry gaseous ammonia through a bed of the powdered dicarboxylic acid. The amount of ammonia introduced was varied to preferentially form mono-ammonium-2,6-naphthalene dicarboxylate (MAN) or diammonium-2,6-naphthalene dicarboxylate (DAN) as the sole products of reaction.

The powdered ammonium salt composition was then subjected to pyrolysis in a heated rotating glass tube by passing pyrolysis gas through the powder, the gas being preheated to the temperature of the salt.

The following experiments illustrate the effect of different experimental parameters upon the purity of the final acid.

| Example No.: | Reactant | Pyrolysis Gas | Temp. | Aldehyde-acid in purified 2,6-naphthalene dicarboxylic acid, p.p.m. |
|---|---|---|---|---|
| 1 | DAN | Air | 280 | 520 |
| 2 | DAN | Air | 200 | 510 |
| 3 | DAN | Helium | 280 | 525 |
| 4 | DAN | Steam | 320 | 97 |
| 5 | DAN | ...do... | 300 | 78 |
| 6 | DAN | ...do... | 280 | 85 |
| 7 | DAN | ...do... | 248 | 100 |
| 8 | DAN | ...do... | 200 | 150 |
| 9 | MAN | ...do... | 320 | 135 |
| 10 | MAN | ...do... | 300 | 90 |
| 11 | MAN | ...do... | 279 | 103 |
| 12 | MAN | ...do... | 251 | 120 |
| 13 | MAN | ...do... | 195 | 170 |

It will be observed from the above data that gases other than steam (e.g., air or helium) are not effective in purifying the starting acid. On the other hand, the process of the invention gives a significant improvement in purity. Also evident from the above data is the preferred temperature of about 300° C. which gives greatest purification.

The invention claimed is:
1. A process for the purification of naphthalene carboxylic acids containing an aldehyde impurity which comprises preparing a solid ammonium salt of said impure acid and then heating said in solid salt at a temperature between about 200° C. and about 300° C. while sweeping said solid salt with steam.
2. The process of claim 1 where the salt is the monoammonium salt of 2,6-naphthalene dicarboxylic acid.
3. The process of claim 2 where the temperature is from about 290° C. to about 300° C.
4. The process of claim 1 where the salt is the diammonium salt of 2,6-naphthalene dicarboxylic acid.
5. The process of claim 4 where the temperature is from about 290° C. to about 300° C.

References Cited
UNITED STATES PATENTS
3,364,256  1/1968  Ichikawa et al. _____ 260—525
FOREIGN PATENTS
825,375  12/1959  Great Britain _____ 260—525

LORRAINE A. WEINBERGER, Primary Examiner

R. S. WEISSBERG, Assistant Examiner